United States Patent
Im et al.

(10) Patent No.: US 11,383,720 B2
(45) Date of Patent: Jul. 12, 2022

(54) VEHICLE CONTROL METHOD AND INTELLIGENT COMPUTING DEVICE FOR CONTROLLING VEHICLE

(71) Applicant: LG ELECTRONICS INC., Seoul (KR)

(72) Inventors: Soungmin Im, Seoul (KR); Hyun Kim, Seoul (KR); Ilyong Lee, Seoul (KR); Sangmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

(21) Appl. No.: 16/485,417

(22) PCT Filed: May 31, 2019

(86) PCT No.: PCT/KR2019/006590
§ 371 (c)(1),
(2) Date: Aug. 12, 2019

(87) PCT Pub. No.: WO2020/241944
PCT Pub. Date: Dec. 3, 2020

(65) Prior Publication Data
US 2021/0331681 A1    Oct. 28, 2021

(51) Int. Cl.
*B60W 40/08*    (2012.01)
*H04W 4/44*    (2018.01)
(Continued)

(52) U.S. Cl.
CPC ............ *B60W 40/08* (2013.01); *B60W 50/16* (2013.01); *B60W 60/0051* (2020.02);
(Continued)

(58) Field of Classification Search
CPC ............ B60W 40/08; B60W 60/0059; B60W 60/0051; B60W 50/16; B60W 2540/225;
(Continued)

(56) References Cited

U.S. PATENT DOCUMENTS 10,657,397 B2 *  5/2020  Ryu .................... B60W 40/04
2003/0181822 A1 *  9/2003  Victor ...................... A61B 5/11
600/558

(Continued)

FOREIGN PATENT DOCUMENTS

| KR | 101386823 | 4/2014 |
| KR | 1020140100629 | 8/2014 |
| KR | 1020190006553 | 1/2019 |

OTHER PUBLICATIONS

PCT International Application No. PCT/KR2019/006590, International Search Report dated Feb. 27, 2020, 3 pages.

*Primary Examiner* — Mohamed Barakat
(74) *Attorney, Agent, or Firm* — Lee Hong Degerman Kang & Waimey

(57) ABSTRACT

Disclosed are a vehicle control method and an intelligent computing device for controlling a vehicle. The processor can detect a gaze response speed of the driver by projecting a virtual object to an HUD when determining that the driver is in a drowsy state. The processor outputs a secondary warning and controls the vehicle to be driven in accordance with the secondary warning when the gaze response speed of the driver is less than a predetermined reference value. Accordingly, it is possible to reduce accidents that occur due to carelessness of drivers. Disclosed are a vehicle control method and an intelligent computing device for controlling a vehicle. The processor can detect a gaze response speed of the driver by projecting a virtual object to an HUD when determining that the driver is in a drowsy state. The processor outputs a secondary warning and controls the vehicle to be driven in accordance with the secondary warning when the gaze response speed of the driver is less than a predetermined reference value. Accordingly, it is possible to reduce accidents that occur due to carelessness of drivers. According to an autonomous vehicle of the present inven- (Continued)

tion, one or more of a user terminal and a server may be associated with an artificial intelligence module, a drone ((Unmanned Aerial Vehicle, UAV), a robot, an AR (Augmented Reality) device, a VR (Virtual Reality) device, a device associated with 5G services, etc.

18 Claims, 15 Drawing Sheets

(51) Int. Cl.
    *B60W 60/00*     (2020.01)
    *B60W 50/16*     (2020.01)
    *G06F 3/01*     (2006.01)
    *G06N 3/08*     (2006.01)
    *H04W 56/00*     (2009.01)
    *H04W 72/04*     (2009.01)
    *G06V 20/59*     (2022.01)
    *G06V 40/18*     (2022.01)
    *B60W 50/14*     (2020.01)

(52) U.S. Cl.
    CPC ......... *B60W 60/0059* (2020.02); *G06F 3/013* (2013.01); *G06N 3/08* (2013.01); *G06V 20/597* (2022.01); *G06V 40/18* (2022.01); *H04W 4/44* (2018.02); *H04W 56/001* (2013.01); *H04W 72/042* (2013.01); *B60W 2040/0827* (2013.01); *B60W 2050/143* (2013.01); *B60W 2050/146* (2013.01); *B60W 2540/221* (2020.02); *B60W 2540/225* (2020.02); *B60W 2540/229* (2020.02); *B60W 2556/45* (2020.02)

(58) Field of Classification Search
    CPC ....... B60W 2556/45; B60W 2540/229; B60W 2540/221; B60W 2040/0827; B60W 2050/143; B60W 2050/146; H04W 4/44; H04W 56/001; H04W 72/042; G06F 3/013; G06K 9/00597; G06K 9/00845; G06N 3/08; G06V 20/597; G06V 40/18
    See application file for complete search history.

(56) References Cited

U.S. PATENT DOCUMENTS

| | | | |
|---|---|---|---|
| 2010/0253526 A1 | 10/2010 | Szczerba et al. | |
| 2014/0139655 A1* | 5/2014 | Mimar | G08B 21/0476 |
| | | | 348/77 |
| 2016/0209647 A1 | 7/2016 | Fursich | |
| 2018/0129891 A1* | 5/2018 | Ryu | G06K 9/00845 |
| 2019/0054927 A1* | 2/2019 | Hayakawa | G08G 1/14 |
| 2019/0202464 A1* | 7/2019 | McGill | B60W 30/182 |
| 2019/0213429 A1* | 7/2019 | Sicconi | G06F 3/016 |
| 2020/0339131 A1* | 10/2020 | Olsson | B60K 28/066 |

* cited by examiner

VEHICLE CONTROL METHOD AND INTELLIGENT COMPUTING DEVICE FOR CONTROLLING VEHICLE

CROSS-REFERENCE TO RELATED APPLICATIONS

This application is the National Stage filing under 35 U.S.C. 371 of International Application No. PCT/KR2019/006590, filed on May 31, 2019, the contents of which are all hereby incorporated by reference herein in its entirety.

TECHNICAL FIELD

The present invention relates to a vehicle control method and an intelligent computing device for controlling a vehicle and, more particularly, a vehicle control method and an intelligent computing device for controlling a vehicle that reflect state information of a driver.

BACKGROUND ART

A vehicle is one of transportation that carries users in the vehicle in a desired direction and a car can be representatively exemplified. Vehicles provide convenience for moving to users, but it is required to carefully look at the front area and the rear area while driving. The front area and the rear area may mean driving interference factors such as an object, that is, a person, a vehicle, and an obstacle that approach or are positioned around a vehicle.

Accordingly, in the related art, in order to take a driver out of a careless state or a drowsy state, the driver is made periodically press an anti-sleep button or an alarm is provided after determining that a driver drowses.

However, inconvenience that a driver has to periodically press a button even though he/she is completely awake may exist. Further, there may be a problem in that the accuracy of drowsiness determination is low or a driver does not trust an anti-sleep system.

DISCLOSURE

Technical Problem

An object of the present invention is to solve the necessities and/or problems described above.

Further, an object of the present invention is to make passive intervention and active intervention of a driver be sequentially performed by determining a drowsy state of the driver.

Further, an object of the present invention is to improve the reliability of an anti-sleep system by determining a drowsy state of a driver through AI processing.

Further, an object of the present invention is to prevent occurrence of an accident due to carelessness of a driver by converting into an autonomous mode in consideration of a response speed of a driver to instructions required by a vehicle even in a drowsy state.

Further, the present invention can induce a driver to actively take measures in a drowsy state by checking a response speed of the driver in a careless state or a drowsy state and making the driver recognize the drowsy state.

Technical Solution

A vehicle control method according to an aspect of the present invention includes: acquiring state information of a driver and determining a drowsy state of the driver on the basis of the state information of the passenger; outputting a primary warning when recognizing the drowsy state of the driver, the primary warning including an operation of showing a virtual object through a head-up display (HUD) when recognizing the drowsy state of the driver; acquiring a gaze response speed of the driver to the virtual object by tracing the gaze of the driver through a camera in a vehicle; providing feedback according to the gaze response speed; and outputting a secondary warning and controlling the vehicle in accordance with the secondary warning when determining that the gaze response speed is lower than a predetermined reference.

The state information of the driver may include at least one of the number of times of closing eyelids, an open size of eyelids, or a movement speed of eyelids of the passenger acquired by analyzing camera images.

The state information of a driver may include heart rate (HR) information that is acquired through at least one heart rate sensor and the heart rate information includes a heart rate variability (HRV) signal.

The determining of a drowsy state of the driver may further include: extracting characteristic values from sensing information that is acquired through at least one sensor; and inputting the characteristic values into an artificial neural network (ANN) classifier trained to discriminate whether the passenger is in a wakeful state or a drowsy state, and determining a drowsy state of the driver from output of the artificial neural network, and the characteristic values may be values enabling discrimination of the wakeful state and the drowsy state of the driver.

The outputting of a primary warning may further include outputting an instruction that demands an action of the driver in correspondence to the primary warning, and the secondary warning may be output when the action of the driver is not recognized as a response to the instruction within a predetermined time.

The outputting of an instruction that demands an action of the driver may include an alarm that is displayed on the HUD and an operation that is continuously displayed until a specific action is recognized in accordance with the alarm.

The vehicle control method may further include: outputting a response speed of the driver when the action of the driver for the instruction is recognized within the predetermined time; and determining a current state of the driver according to the response speed of the driver and outputting the current state of the driver.

Recognizing an action of the driver may include at least one of recognizing input from a button disposed in the vehicle, recognizing that a window of the vehicle is opened, recognizing that an accelerator or brake pedal is depressed, or recognizing that a seatbelt is pulled.

The feedback may include at least one of an actual response speed in a drowsy state of the driver, a comparison result with a response speed in a wakeful state, or an alarm that recommend coming out of the drowsy state.

The feedback may include at least one of an operation that automatically adjusts the degree of contraction of a seatbelt, an operation of outputting vibration to a seat, and an operation of operating an automatic air-conditioning system.

The vehicle control method may further include transmitting a V2X message including information related to the drowsy state of the driver to another terminal connected with the vehicle for communication.

In the vehicle control method, the controlling of the vehicle in accordance with the secondary warning may further include: converting a driving mode of the vehicle into an autonomous mode from a manual driving mode; and searching for a position where the vehicle is stopped in the autonomous driving mode and controlling the vehicle to move to the searched position and stop driving.

The vehicle control method may further include receiving DCI (Downlink Control Information), which is used to schedule transmission of the state information of the driver acquired from at least one sensor disposed in the vehicle, from a network, in which the state information of the driver may be transmitted to the network on the basis of the DCI.

The vehicle control method may further include performing an initial access procedure to the network on the basis of an SSB (Synchronization signal block), in which the state information of the driver may be transmitted to the network through a PUSCH, and the SSB and a DM-RS of the PUSCH may be QCL with respect to a QCL type D.

The vehicle control method may further include: controlling a communication unit to transmit the state information of the driver to an AI processor included in the network; and controlling the communication unit to receive AI-processed information from the AI processor, in which the AI-processed information may be information determining the state of the driver is any one of a wakeful state or a drowsy state.

An intellectual computing device for controlling a vehicle according to another aspect of the present invention includes: a camera disposed in the vehicle; a head-up display; a sensing unit including at least one sensor; a processor; and a memory including a command that can be executed by the processor, in which the command: outputs a primary warning by showing a virtual object on a windshield of the vehicle through the head-up display when recognizing a drowsy state of a driver on the basis of state information of the driver acquired through the sensing unit; and acquires a gaze response speed of the driver to the virtual object by tracing the gaze of the driver through the camera, provides feedback according to the gaze response speed, and outputs a secondary warning and controls the vehicle in accordance with the secondary warning when determining that the gaze response speed is lower than a predetermined reference.

The processor may extract characteristic values from sensing information that is acquired through at least one sensor, input the characteristic values into an artificial neural network (ANN) classifier trained to discriminate whether the passenger is in a wakeful state or a drowsy state, and determines a drowsy state of the driver from output of the artificial neural network, and the characteristic values may be values enabling discrimination of the wakeful state and the drowsy state of the driver.

The intellectual computing device further includes a communication unit, in which the processor may control the communication unit to transmit the state information of the driver to an AI processor included in the network; and may control the communication unit to receive AI-processed information from the AI processor, and the AI-processed information may be information determining that the state of the driver is any one of a wakeful state or a drowsy state.

Effects of the vehicle control method and the intelligent computing device for controlling a vehicle according to the present invention are described hereafter.

The present invention can prevent occurrence of an accident due to carelessness of a driver by sequentially inducing passive intervention and active intervention of a driver by determining a drowsy state of the driver.

Further, the present invention can improve the reliability of an anti-sleep system by determining a drowsiness state of a driver through AI processing.

Further, the present invention can prevent occurrence of an accident due to carelessness of a driver by converting into an autonomous mode in consideration of a response speed of a driver to instructions required by a vehicle even in a drowsy state.

Further, the present invention can induce a driver to actively take measures in a drowsiness state by checking a response speed of the driver in a careless state or a drowsiness state and making the driver recognize the drowsiness state.

The effects of the present disclosure are not limited to the effects described above and other effects can be clearly understood by those skilled in the art from the following description.

Accompanying drawings included as a part of the detailed description for helping understand the present invention provide embodiments of the present invention and are provided to describe characteristics of the present invention with the detailed description.

MODE FOR INVENTION

Hereinafter, embodiments of the disclosure will be described in detail with reference to the attached drawings. The same or similar components are given the same reference numbers and redundant description thereof is omitted.

The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
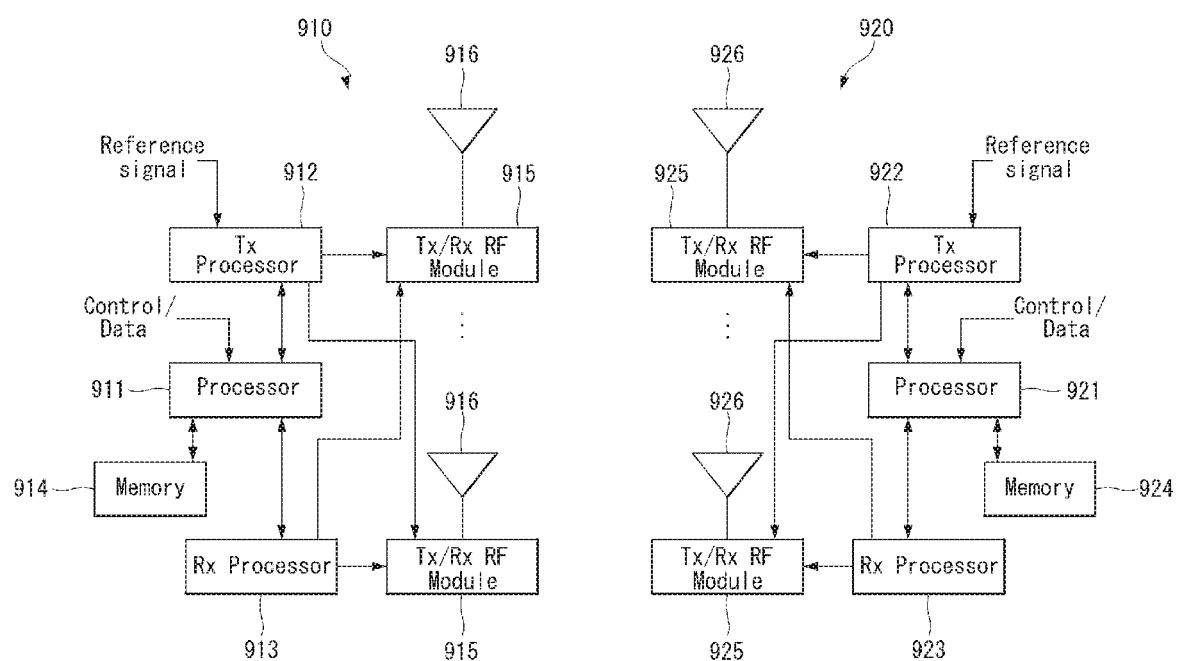
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user.

For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world.

For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

According to an embodiment of the present invention, the first communication device may be a vehicle, and the second communication device may be a 5G network.

B. Signal Transmission/Reception Method in Wireless Communication System

Figure 2:
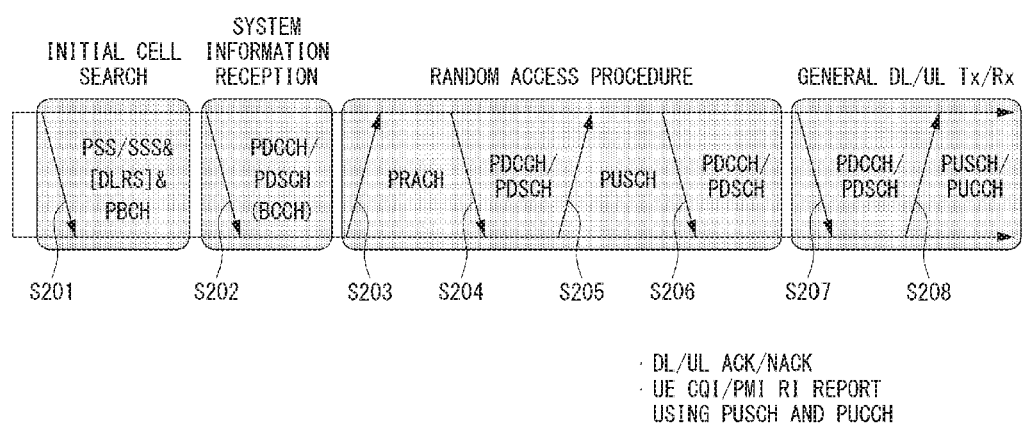
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set.

Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits.

In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1.

The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
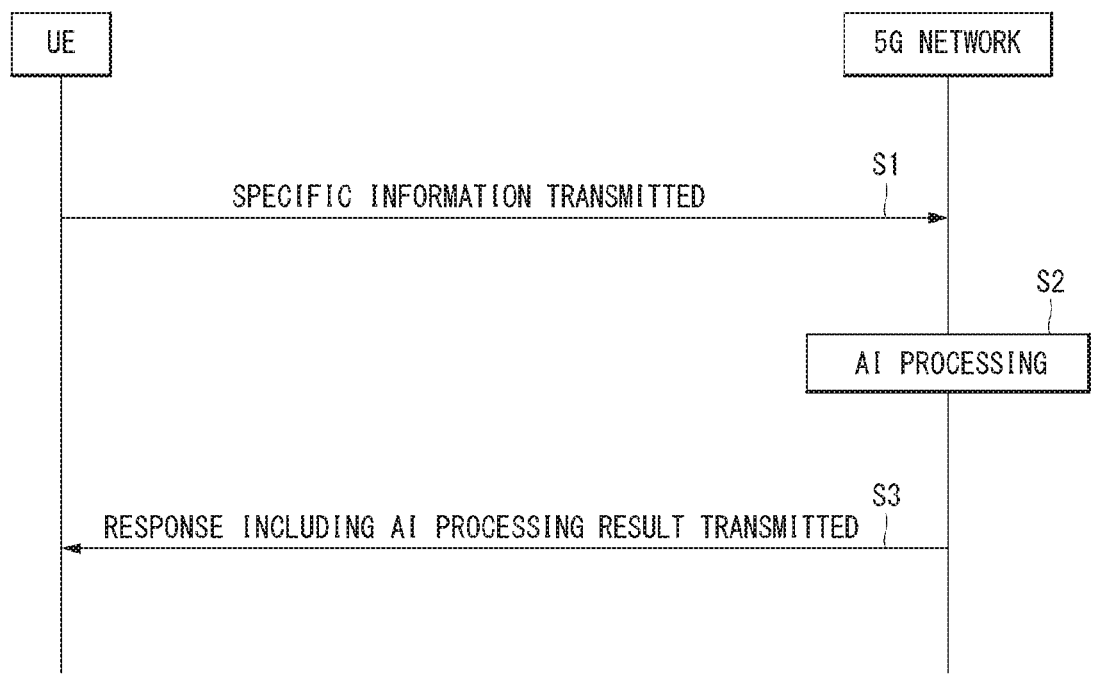
FIG. 3 shows an example of basic operations of an user equipment and a 5G network in a 5G communication system

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
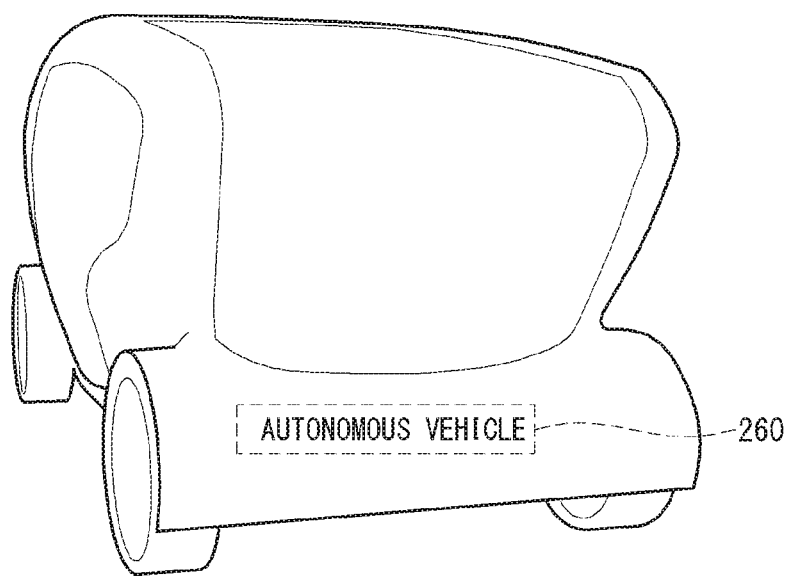
FIG. 4 is a diagram showing a vehicle according to an embodiment of the present invention.
Figure 4:
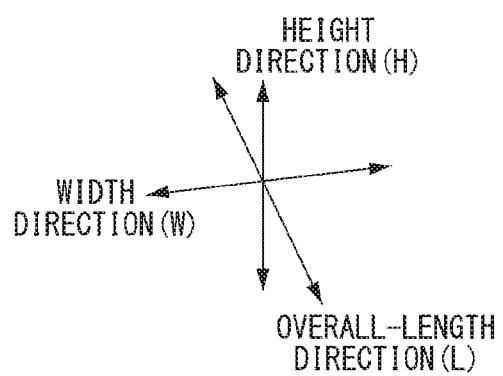

FIG. 4 is a diagram showing a vehicle according to an embodiment of the present invention.

Referring to FIG. 4, a vehicle 10 according to an embodiment of the present invention is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

Figure 5:
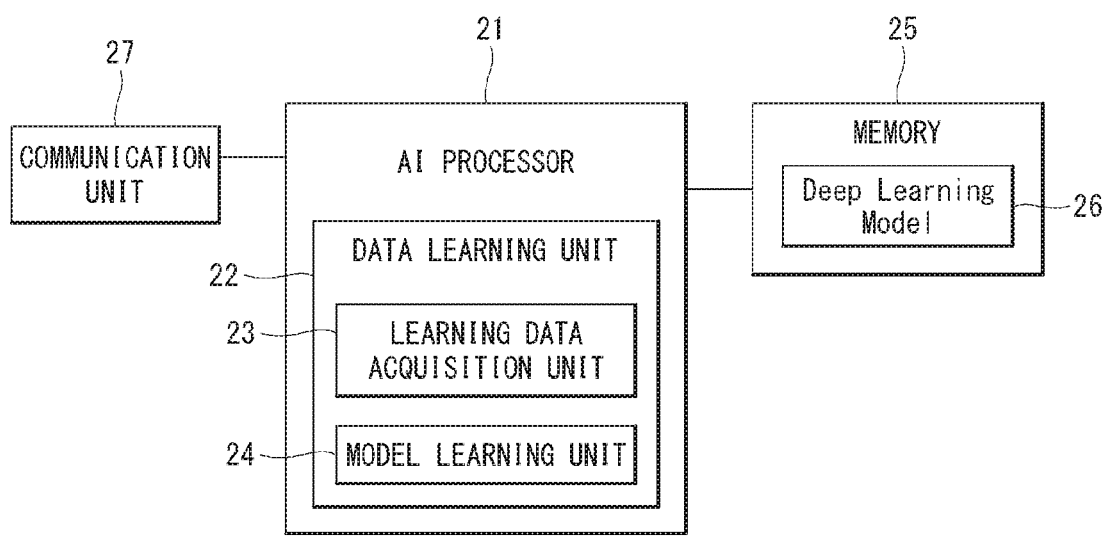
FIG. 5 is a block diagram of an AI device according to an embodiment of the present invention.

FIG. 5 is a block diagram of an AI device according to an embodiment of the present invention.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 4. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 6:
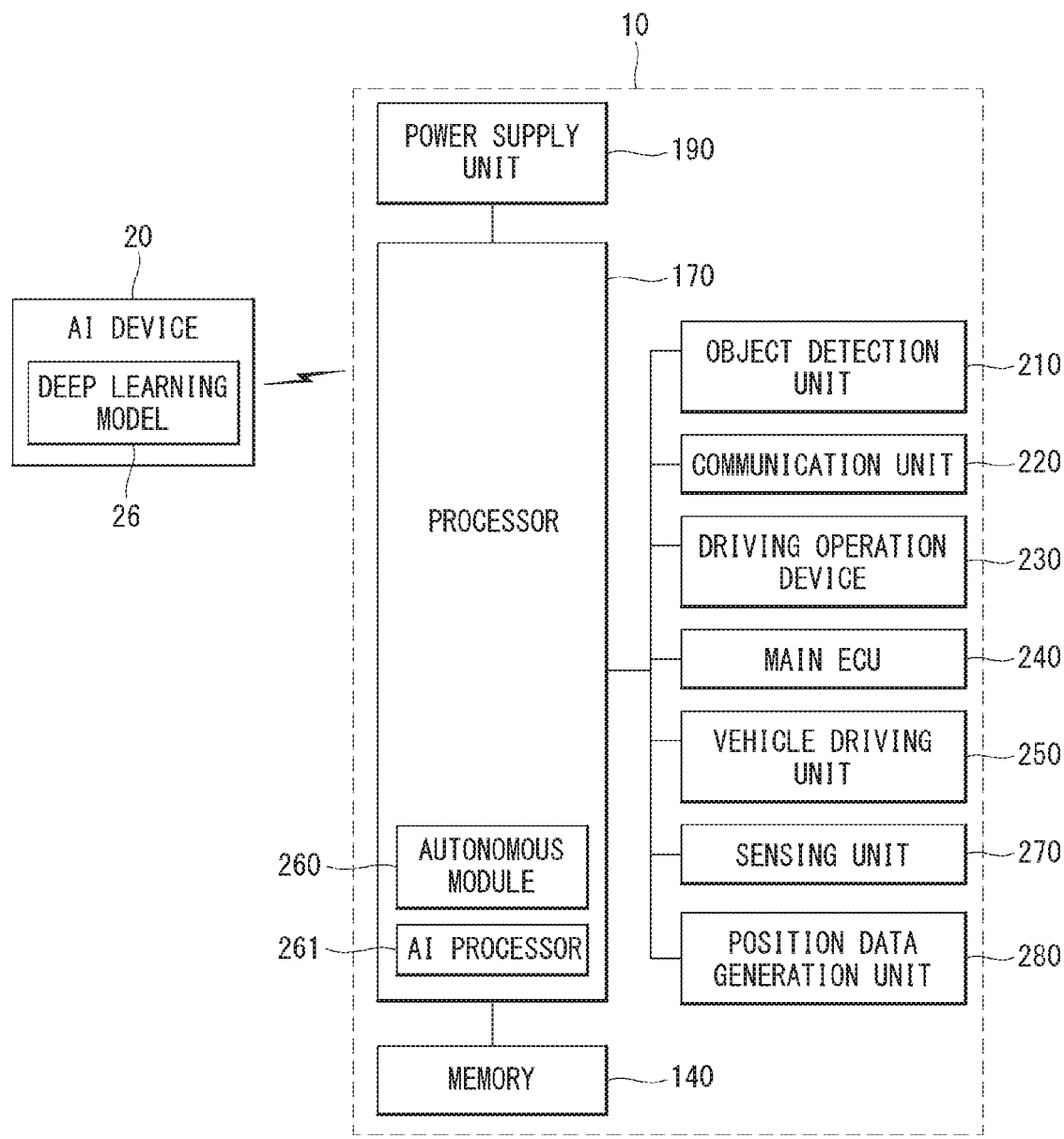
FIG. 6 is a diagram for illustrating a system in which an autonomous vehicle and an AI device according to an embodiment of the present invention are linked.

FIG. 6 is a diagram for illustrating a system in which an autonomous vehicle and an AI device according to an embodiment of the present invention are linked.

Referring to FIG. 6, an autonomous vehicle 10 can transmit data that require AI processing to an AI device 20 through a communication unit and the AI device 20 including a neural network model 26 can transmit an AI processing result using the neural network model 26 to the autonomous vehicle 10. The description of FIG. 2 can be referred to for the AI device 20.

The autonomous vehicle 10 may include a memory 140, a processor 170, and a power supply 170 and the processor 170 may further include an autonomous module 260 and an AI processor 261. Further, the autonomous vehicle 10 may include an interface that is connected with at least one electronic device included in the vehicle in a wired or wireless manner and can exchange data for autonomous driving control. At least one electronic device connected through the interface may include an object detection unit 210, a communication unit 220, a driving operation unit 230, a main ECU 240, a vehicle driving unit 250, a sensing unit 270, and a position data generation unit 280.

The interface can be configured using at least one of a communication module, a terminal, a pin, a cable, a port, a circuit, an element, and a device.

The memory 140 is electrically connected with the processor 170. The memory 140 can store basic data about units, control data for operation control of units, and input/output data. The memory 140 can store data processed in the processor 170. Hardware-wise, the memory 140 may be configured using at least one of a ROM, a RAM, an EPROM, a flash drive and a hard drive. The memory 140 can store various types of data for the overall operation of the autonomous vehicle 10, such as a program for processing or control of the processor 170. The memory 140 may be integrated with the processor 170. Depending on embodiments, the memory 140 may be classified as a lower configuration of the processor 170.

The power supply 190 can supply power to the autonomous vehicle 10. The power supply 190 can be provided with power from a power source (e.g., a battery) included in the autonomous vehicle 10 and can supply the power to each unit of the autonomous vehicle 10. The power supply 190 can operate according to a control signal supplied from the main ECU 240. The power supply 190 may include a switched-mode power supply (SMPS).

The processor 170 can be electrically connected to the memory 140, the interface 180, and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal, and provide the signal while power is supplied thereto by the power supply 190.

The processor 170 can receive information from other electronic devices included in the autonomous vehicle 10 through the interface. The processor 170 can provide control signals to other electronic devices in the autonomous vehicle 10 through the interface.

The autonomous device 10 may include at least one printed circuit board (PCB). The memory 140, the interface, the power supply 190, and the processor 170 may be electrically connected to the PCB.

Hereafter, other electronic devices connected with the interface and included in the vehicle, the AI processor 261, and the autonomous module 260 will be described in more detail. Hereafter, for the convenience of description, the autonomous vehicle 10 is referred to as a vehicle 10.

First, the object detection unit 210 can generate information on objects outside the vehicle 10. The AI processor 261 can generate at least one of on presence or absence of an object, positional information of the object, information on a distance between the vehicle and the object, and information on a relative speed of the vehicle with respect to the object by applying data acquired through the object detection unit 210 to a neural network model.

The object detection unit 210 may include at least one sensor that can detect objects outside the vehicle 10. The sensor may include at least one of a camera, a radar, a lidar, an ultrasonic sensor, and an infrared sensor. The object detection unit 210 can provide data about an object generated on the basis of a sensing signal generated from a sensor to at least one electronic device included in the vehicle.

Meanwhile, the vehicle 10 transmits the sensing data acquired through at least one sensor to the AI device 20 through the communication unit 220 and the AI device 20 can transmit AI processing data by applying the neural network model 26 to the transmitted data to the vehicle 10. The vehicle 10 recognizes information about the detected object on the basis of the received AI processing data and the autonomous module 260 can perform an autonomous driving control operation using the recognized information.

The communication unit 220 can exchange signals with devices disposed outside the vehicle 10. The communication unit 220 can exchange signals with at least any one of an infrastructure (e.g., a server and a broadcast station), another vehicle, and a terminal. The communication unit 220 may include at least any one of a transmission antenna, a reception antenna, a radio frequency (RF) circuit which can implement various communication protocols, and an RF element in order to perform communication.

It is possible to generate at least one of on presence or absence of an object, positional information of the object, information on a distance between the vehicle and the object, and information on a relative speed of the vehicle with respect to the object by applying data acquired through the object detection unit 210 to a neural network model.

The driving operation unit 230 is a device for receiving user input for driving. In a manual mode, the vehicle 10 may be driven on the basis of a signal provided by the driving operation unit 230. The driving operation unit 230 may include a steering input device (e.g., a steering wheel), an acceleration input device (e.g., an accelerator pedal), and a brake input device (e.g., a brake pedal).

Meanwhile, the AI processor 261, in an autonomous mode, can generate an input signal of the driving operation unit 230 in accordance with a signal for controlling movement of the vehicle according to a driving plan generated through the autonomous module 260.

Meanwhile, the vehicle 10 transmits data for control of the driving operation unit 230 to the AI device 20 through the communication unit 220 and the AI device 20 can transmit AI processing data generated by applying the neural network model 26 to the transmitted data to the vehicle 10. The vehicle 10 can use the input signal of the driving operation unit 230 to control movement of the vehicle on the basis of the received AI processing data.

The main ECU 240 can control the overall operation of at least one electronic device included in the vehicle 10.

The vehicle driving unit 250 is a device for electrically controlling various vehicle driving devices included in the vehicle 10. The vehicle driving unit 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device, and a suspension driving control device. Meanwhile, the safety device driving control device may include a seatbelt driving control device for seatbelt control.

The vehicle driving unit 250 includes at least one electronic control device (e.g., a control ECU (Electronic Control Unit)).

The vehicle driving unit 250 can control a power train, a steering device, and a brake device on the basis of signals received by the autonomous module 260. The signals received by the autonomous module 260 may be driving control signals that are generated by applying a neural network model to data related to the vehicle in the AI processor 261. The driving control signals may be signals received from the external AI device 20 through the communication unit 220.

The sensing unit 270 can sense a state of the vehicle. The sensing unit 270 may include at least any one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor, and a magnetic sensor.

The AI processor 261 can generate state data of the vehicle by applying a neural network model to sensing data generated by at least one sensor. The AI processing data generated by applying the neural network model may include vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an accelerator pedal, data of a pressure applied to a brake pedal, etc.

The autonomous module 260 can generate a driving control signal on the basis of the AI-processed state data of the vehicle.

Meanwhile, the vehicle 10 transmits the sensing data acquired through at least one sensor to the AI device 20 through the communication unit 22 and the AI device 20 can transmit AI processing data generated by applying the neural network model 26 to the transmitted data to the vehicle 10.

The position data generation unit 280 can generate position data of the vehicle 10. The position data generation unit 280 may include at least any one of a global positioning system (GPS) and a differential global positioning system (DGPS).

The AI processor 261 can generate more accurate position data of the vehicle by applying a neural network model to position data generated by at least one position data generation device.

In accordance with an embodiment, the AI processor 261 can perform deep learning calculation on the basis of at least any one of the internal measurement unit (IMU) of the sensing unit 270 and the camera image of the object detection unit 210 and can correct position data on the basis of the generated AI processing data.

Meanwhile, the vehicle 10 transmits the position data acquired from the position data generation unit 280 to the AI device 20 through the communication unit 220 and the AI device 20 can transmit the AI processing data generated by applying the neural network model 26 to the received position data to the vehicle 10.

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

The autonomous module 260 can generate a route for autonomous driving and a driving plan for driving along the generated route on the basis of the acquired data.

The autonomous module 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring), and TJA (Traffic Jam Assist).

The AI processor 261 can transmit control signals that can perform at least one of the ADAS functions described above to the autonomous module 260 by applying traffic-related information received from at least one sensor included in the vehicle and external devices and information received from another vehicle communicating with the vehicle to a neural network model.

Further, the vehicle 10 transmits at least one data for performing the ADAS functions to the AI device 20 through the communication unit 220 and the AI device 20 can transmit the control signal that can perform the ADAS functions to the vehicle 10 by applying the neural network model 260 to the received data.

The autonomous module 260 can acquire state information of a driver and/or state information of a vehicle through the AI processor 261 and can perform switching from an autonomous mode to a manual driving mode or switching from the manual driving mode to the autonomous mode.

Meanwhile, the vehicle 10 can use AI processing data for passenger support for driving control. For example, as described above, it is possible to check the states of a driver and passengers through at least one sensor included in the vehicle.

Alternatively, the vehicle 10 can recognize voice signals of a driver or passengers, perform a voice processing operation, and perform a voice synthesis operation through the AI processor 261.

5G communication for implementing the vehicle control method according to an embodiment of the present invention and schematic contents for performing AI processing by applying the 5G communication and for transmitting/receiving the AI processing result were described above.

Hereafter, a detailed method of passively intervening or actively intervening in a careless state of a driver on the basis of state information of the driver in accordance with an embodiment of the present invention is described with reference to necessary drawings.

Figure 7:
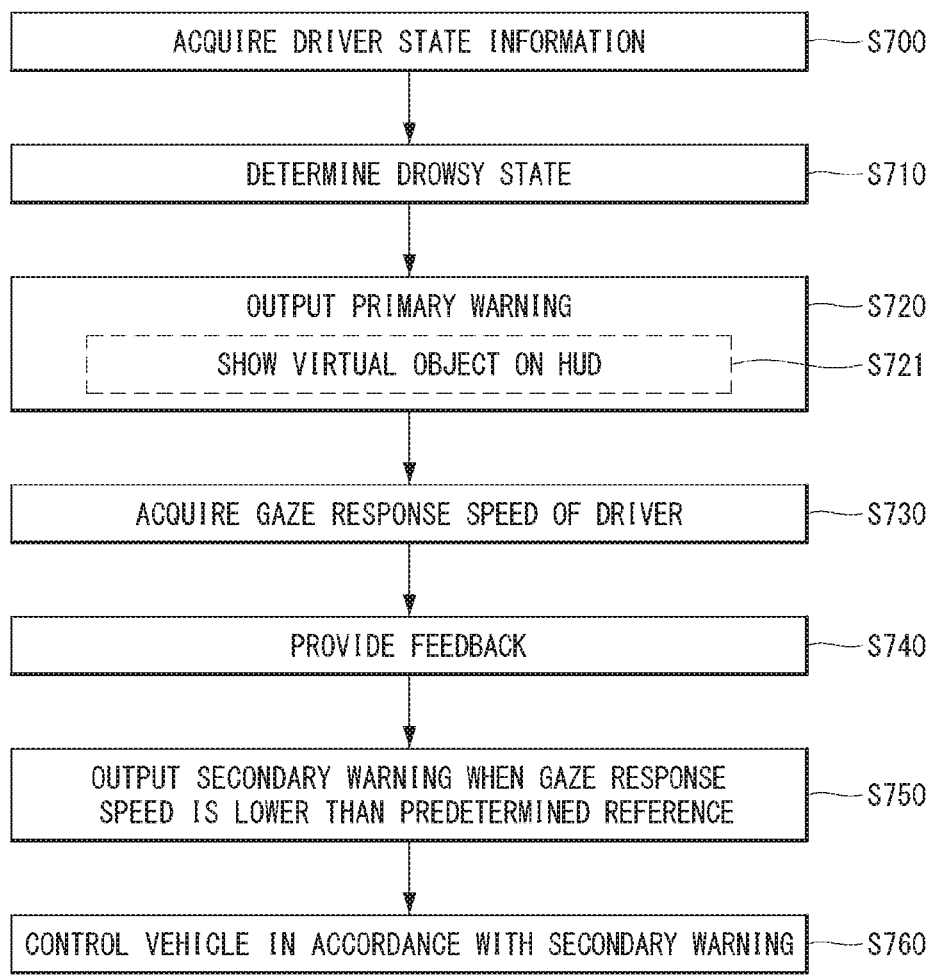
FIG. 7 is a flowchart of a vehicle control method according to an embodiment of the present invention.

FIG. 7 is a flowchart of a vehicle control method according to an embodiment of the present invention.

A vehicle control method according to an embodiment of the present invention may be implemented in a vehicle a vehicle including the functions described with reference to FIGS. 1 to 5 or an intelligent device controlling the vehicle. In more detail, a vehicle control method according to an embodiment of the present invention may be implemented in the vehicle 10 described with reference to FIGS. 4 to 6.

The processor (170 in FIG. 5) can acquire state information of a driver (S700).

The processor 170 can acquire state information of a driver through at least one sensor disposed in a vehicle.

The at least one sensor may be at least one camera disposed in the vehicle 10. For example, the camera may be disposed to photograph a driver in front-rear and left-right directions. The processor 170 can use at least one of the number of times of closing eyelids, the open size of eyelids, or a movement speed of eyelids of a driver to determine the state information of the driver by analyzing images acquired from the camera. For example, when the speed of blinking eyes exceeds a predetermined reference value, the movement speed of eyelids can be determined as a drowsy state. Further, for example, it is possible to measure the depth of blinking eyes and determine a drowsy state on the basis of the depth of blinking eyes in a wakeful state. That is, the processor 170 can analyze images acquired through the camera using the number of times of closing eyelids, the open size of eyelids, and the movement speed of eyelids of a driver as reference values and can transmit the analysis result to the processor 170.

Further, the at least one sensor may include at least one heart rate (HR) sensor. The state information of a driver may include heart rate (HR) information that is acquired through the heart rate sensor and the heart rate information may include a heart rate variability (HRV) signal. The heart rate sensor, which is a type that a driver carries, can be physically worn on the body of a driver. Further, for example, the heart rate sensor may detect the heart rate of a driver at a predetermined distance from the driver, using an imaging technology. The rate sensor may be configured to continuously or manually capture a heart rate while a driver drives and to output a timestamp data stream including the current value of the captured heart rate information.

The rate sensor may be packaged in a wearable device. The vehicle 10 can transmit heart rate information, which is wirelessly transmitted from a wearable device that a driver wears, to a 5G network. Further, the wearable device may transmit the timestamp data stream output from the heart rate sensor directly to the 5G network through a wireless communication unit not through the vehicle. The wireless communication may be implemented using a Bluetooth personal area network. Further, the wireless communication may be implemented using a Wi-Fi local area network or may be implemented using a combination of different wireless network technologies.

The processor 170 can determine a drowsy state of the passenger on the basis of the state information of the driver (S710).

The detailed process of determining a drowsy state will be described below with reference to FIG. 7. As described above, determining a drowsy state on the basis of state information of the driver may be performed in the vehicle 10 itself or on a 5G network.

When recognizing a drowsy state of the driver, the processor 170 can output a primary warning (S720).

The primary warning may be output on a head-up display (HUD). Outputting the primary warning may include an operation that shows a virtual object on the HUD (S721).

An HUD that is mounted on a vehicle may use an optical see-through information providing manner. The optical see-through manner is a manner in which a driver looks at the outside with his/her eyes through a transparent display and simultaneously looks at a virtual object overlapped and displayed on the transparent display. An optical see-through manner that can be applied to vehicles can be large classified into a display panel manner, a laser manner, and a projection manner in accordance with the implementation method. Various implementations of the optical see-through manner well known in the art and omitted.

Meanwhile, in order to prevent the virtual object that is projected to the HUD from disturbing a driver in driving, an image can be projected in the traveling direction of the vehicle 10.

The processor 170 can acquire the gaze response speed of the driver to the virtual object by tracing the driver's gaze through a camera in the vehicle (S730).

The processor 170 extracts characteristic points (eyes, eyelids, lips, glasses, etc.) from the face image of the driver photographed through the camera. The processor 170 can detect the positions of the characteristic points in a face coordinate system (x, y, z) created on the basis of a face center point. In this case, it is possible to create a face coordinate system on the basis of not the face center point, but any point in the images. The processor 170 can calculate the movement amount of the face and the rotational amount of the face in a predetermined time unit on the basis of position changes of the characteristic points in the face coordinate system according to movement of the driver's face. The movement amount of the face may mean a movement distance of the face that is generated by movement of the body and the rotational amount of the face may mean a direction vector showing 2-axial rotational angle (roll, pitch, yaw). The processor 170 can store in real time the position and the direction vector of the driver's face and the method of detecting the direction vector of the face can be variously implemented.

The processor 170 can provide feedback according to the gaze response speed (S740).

The processor 170 can provide feedback making it possible to check the response speed of the driver to output of the primary warning. For example, the feedback may include at least one of the actual response speed in a drowsy state of the driver, a result of comparison with the response speed in a wakeful state, or an alarm that recommend coming out of the drowsy state. For example, the alarm can output messages such as "You took 5 seconds to recognize a virtual object. It is late than normal. Take a rest and then go if you are sleepy." or "You are in a very drowsy state. You have to take a rest." through a display, an HUD, or a sound output unit in the vehicle.

Further, the feedback may include an output signal that stimulates the body of the driver. For example, the feedback may include at least one of an operation that automatically adjusts the degree of contraction of a seatbelt, an operation that controls vibration output of a vibration module disposed in a seat, and an operation that adjusts the operation of an automatic air-conditioning system.

When the processor 170 determines that the gaze response speed is lower than a predetermined reference, the processor 170 can output a secondary warning (S750). Thereafter, the processor 170 can control the vehicle in accordance with the secondary warning (S760).

If the primary warning described above is passive intervention for removing the careless state of a driver, the secondary warning and control of a vehicle according to the secondary warning may be a process of active intervention. For example, it may be possible to output a loud sound for awaking a driver in a drowsy state, convert into an autonomous mode, or forcibly move to a specific position in the autonomous mode and then stop driving.

Figure 8:
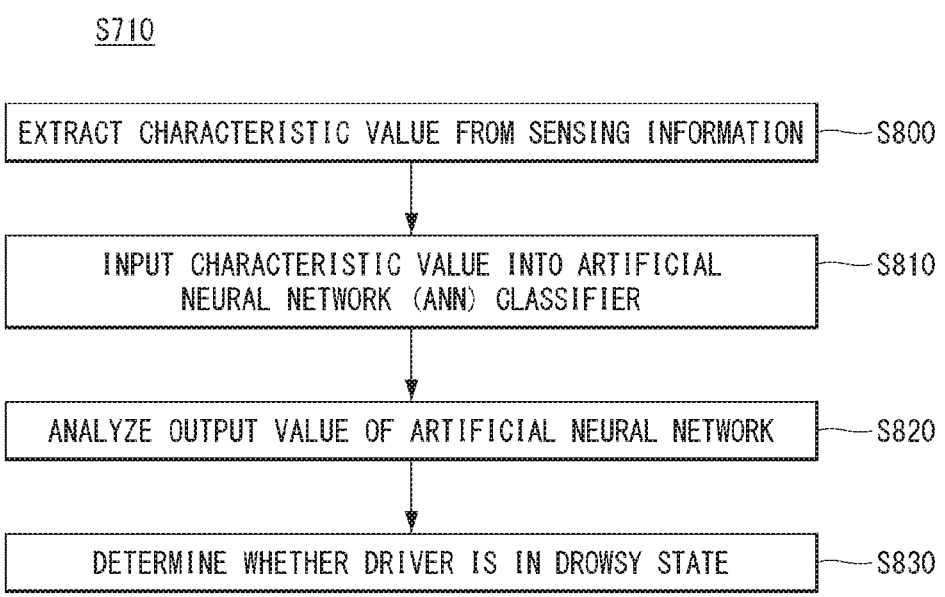
FIG. 8 is a diagram for illustrating an example of determining a drowsy state in an embodiment of the present invention.

FIG. 8 is a diagram for illustrating an example of determining a drowsy state in an embodiment of the present invention.

Referring to FIG. 8, the processor 170 can extract characteristic values from sensing information that is acquired through at least one sensor to determine a drowsy state of the driver (S800).

For example, the processor 170 can receive heart rate information from at least one sensor (e.g., a heart rate sensor). The processor 170 can extract a characteristic value from the heart rate information. The characteristic value is a value determined to show in detail conversion from a wakeful state of a driver into a drowsy state of the driver of at least one characteristic value that can be extracted from the heart rate information.

The processor 170 can control the characteristic values to be input to an artificial neural network (ANN) classifier trained to discriminate whether the passenger is in a wakeful state or a drowsy state (S810).

The processor 170 can create drowsiness detection input by combining the extracted characteristic values. The drowsiness detection input can be input to the artificial neural network (ANN) classifier trained to discriminate a wakeful state and a drowsy state of a driver on the basis of the extracted characteristic values.

The processor 170 can analyze an output value of the artificial neural network (S820) and can determine the drowsy state of the driver on the basis of the output value of the artificial neural network (S830).

The processor 170 can recognize whether the driver starts drowsing or is in a drowsy state from the output of the artificial neural network classifier.

Meanwhile, although it was exemplified in FIG. 8 that an operation of recognizing a drowsy state of a driver through AI processing is implemented by processing of the vehicle 10, the present invention is not limited thereto. For example, the AI processing may be performed on a 5G network on the basis of sensing information received from the vehicle 10.

Figure 9:
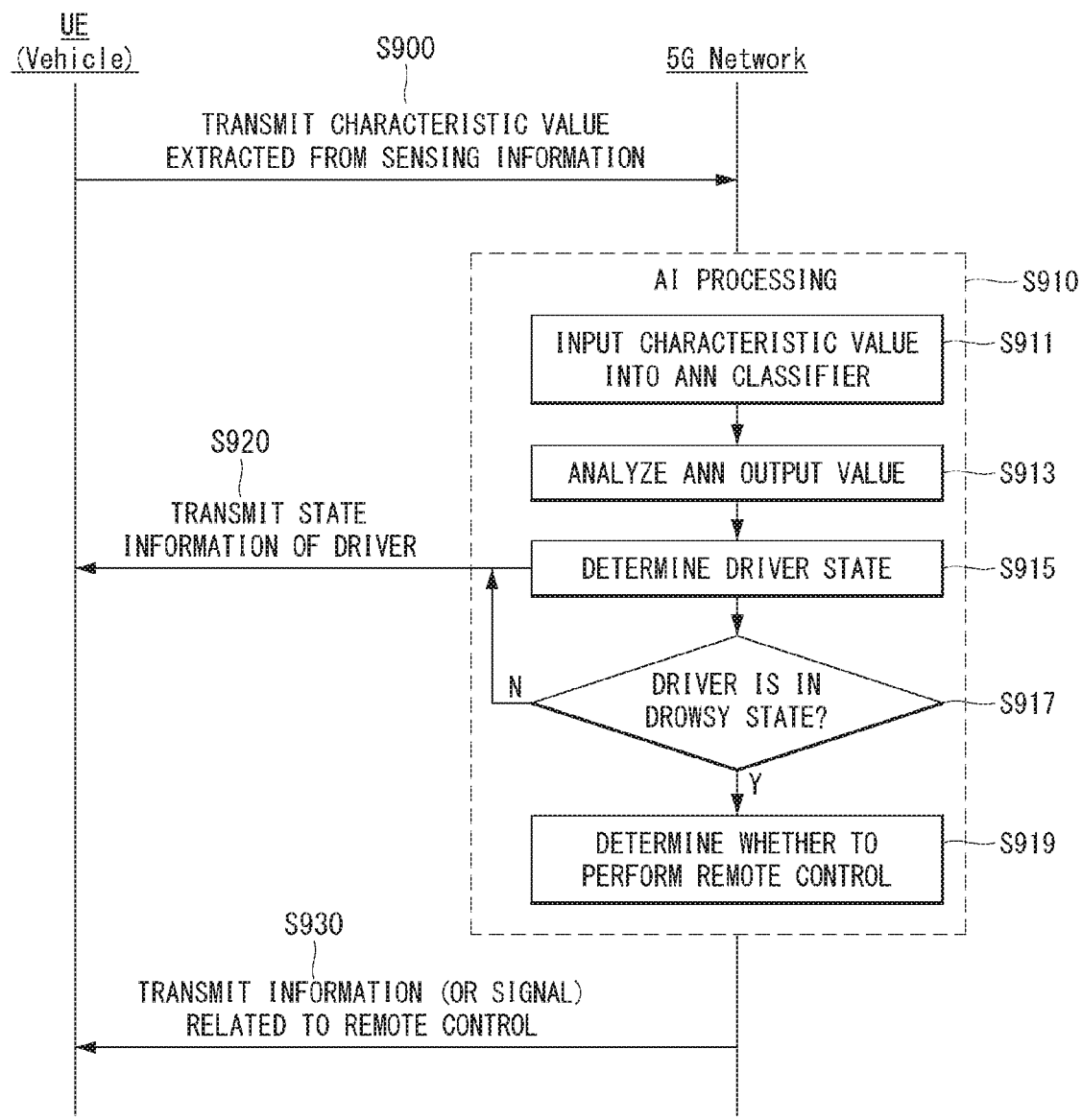
FIG. 9 is a diagram for illustrating another example of determining a drowsy state in an embodiment of the present invention.

FIG. 9 is a diagram for illustrating another example of determining a drowsy state in an embodiment of the present invention.

The processor 170 can control a communication unit to transmit a state information of the driver to an AI processor included in a 5G network. Further, the processor 170 can control the communication unit to receive AI-processed information from the AI processor.

The AI-processed information may be information determining the state of the driver is any one of a wakeful state or a drowsy state.

Meanwhile, the vehicle 10 can perform an initial access procedure to the 5G network to transmit the state information of the driver to the 5G network. The vehicle 10 can perform the initial access procedure to the 5G network on the basis of an SSB (Synchronization signal block).

Further, the vehicle 10 can receive DCI (Downlink Control Information), which is used to schedule transmission of the state information of the driver acquired from at least one sensor disposed in the vehicle, from a network through a wireless communication unit.

The processor 170 can transmit the state information of the driver to the network on the basis of the DCI.

The state information of the driver is transmitted to the network through a PUSCH, and the SSB and a DM-RS of the PUSCH may be QCL with respect to a QCL type D.

Referring to FIG. 9, the vehicle 10 can transmit a characteristic value extracted from sensing information to the 5G network (S900).

The 5G network may include an AI processor or an AI system and the AI system of the 5G network can perform AI processing on the basis of received sensing information (S910).

The AI system can input characteristic values received from the vehicle 10 to an ANN classifier (S911). The AI system can analyze an ANN output value (S913) and can determine the state of the driver from the ANN output value (S915). The 5G network can transmit the state information of the driver determined by the AI system to the vehicle 10 through a wireless communication unit.

In this case, the state information of the driver may include whether the driver is in a wakeful state, in a drowsy state, in a state of starting to convert from a wakeful state into a drowsy state, etc.

When the driver is determined as being in a drowsy state (or including the case that starts to convert from a wakeful state into a drowsy state) (S917), the AI system can deprive the driver who is in the drowsy state of the driving control right by converting into an autonomous mode of the vehicle that is driven in a manual driving mode.

When the driver is in a drowsy state, the AI system can determined whether to perform remote control (S919). Further, the AI system can transmit information (or a signal) related to remote control to the vehicle 10.

Meanwhile, the vehicle 10 transmits only sensing information to the 5G network and may extract a characteristic value corresponding to drowsiness detection input that will be used as input of an artificial neural network for determining a drowsy state of the driver from the sensing information in the AI system included in the 5G network.

Figure 10:
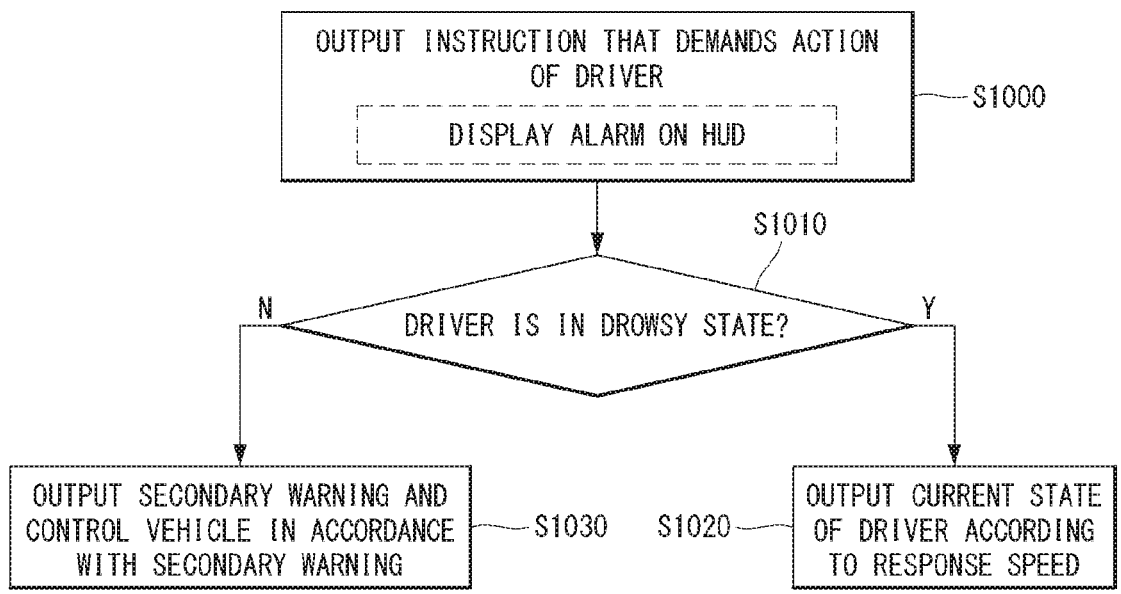
FIG. 10 is a flowchart of a vehicle control method in which a vehicle passively intervenes in a drowsy state of a driver in accordance with an embodiment of the present invention.

FIG. 10 is a flowchart of a vehicle control method in which a vehicle passively intervenes in a drowsiness state of a driver in accordance with an embodiment of the present invention.

Referring to FIG. 10, when a driver is determined as being in a drowsy state, the processor 170 output a primary warning and can output an instruction that demands an action of the driver in correspondence to the primary warning (S1000). As described above, the purpose of the primary warning is to make the driver come out of a drowsy state by making the driver recognize a virtual object that is output on an HUD. The instruction that demands an action of the driver may include an alarm that is displayed on the HUD and an operation that is continuously displayed until a specific action is recognized in accordance with the alarm.

The processor 170 can determine whether an action of the driver is recognized within a predetermined time (S1010).

When an action of the driver is recognized within a predetermined time, the processor 170 can output the current state of the driver according to a response speed of the driver (S1020).

For example, when a gaze response speed of the driver to a virtual object shown on the HUD is less than a predetermined reference time, the processor 170 performed control such that the virtual object is projected on the HUD by determining the state of the driver as a drowsy state, but can determine that state of the driver has been converted into a wakeful state from the drowsy state due to appearance of the virtual object.

When an action of the driver is not recognized within the predetermined time, the processor 170 can output a secondary warning and can control the vehicle in accordance with the secondary warning (S1030).

Recognizing an action of the driver may include at least one of recognizing input from a button disposed in the vehicle, recognizing that a window of the vehicle is opened, recognizing that the accelerator or brake pedal is depressed, or recognizing that a seatbelt is pulled.

Figure 11:
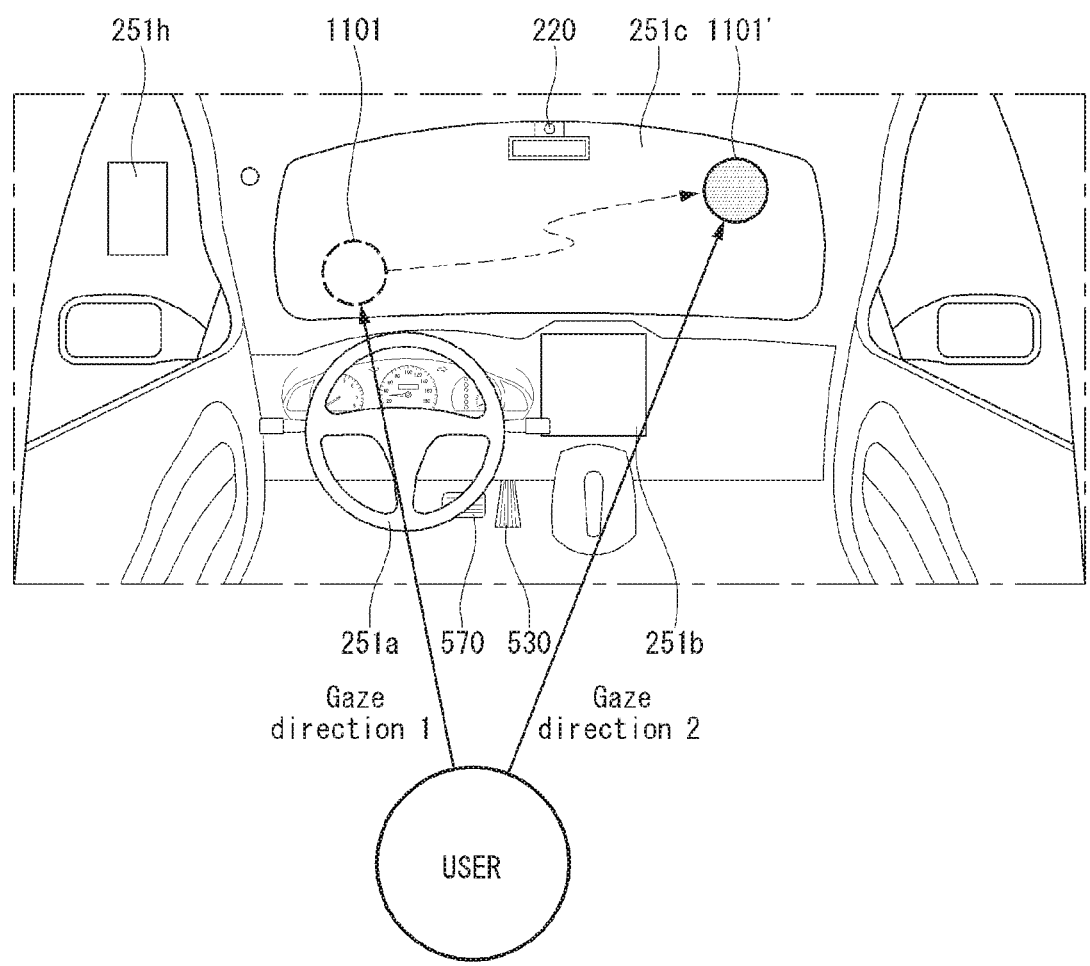
FIGS. 11 to 12 are diagrams for illustrating the example shown in FIG. 10.
Figure 12:
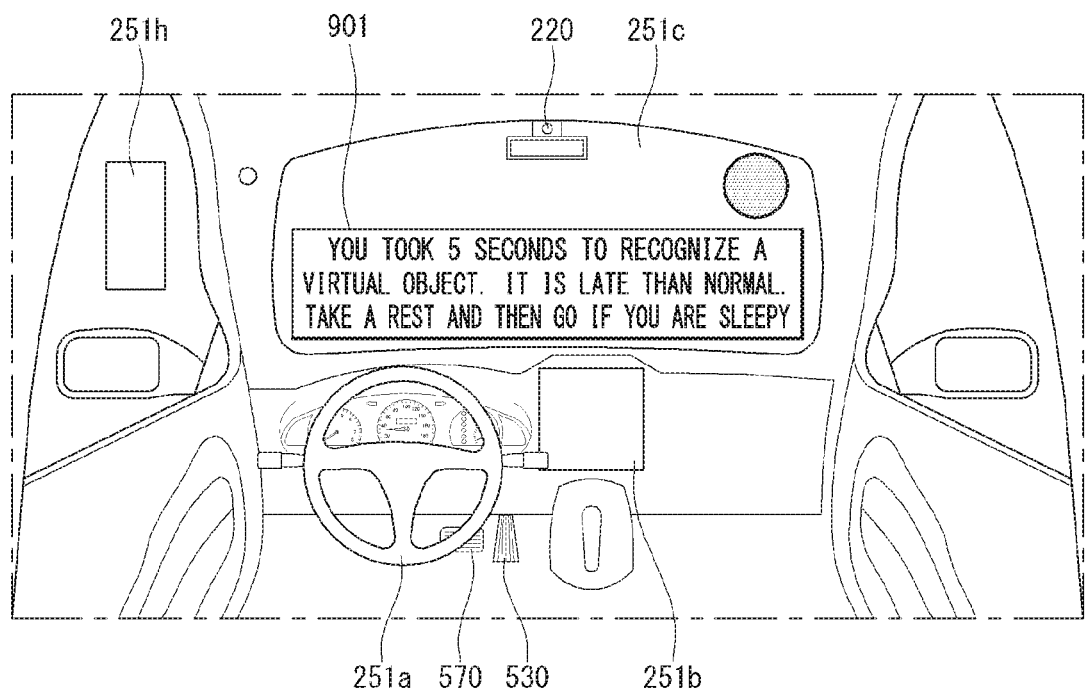

FIGS. 11 to 12 are diagrams for illustrating the example shown in FIG. 10.

Referring to FIG. 11, when a drowsy state of a driver is recognized, the processor 170 performs control such that a virtual object 1101 is projected to the HUD, that is, the virtual object 1101 at a first position to a virtual object 1101' at a second position on the windshield within a short time.

The processor 170 traces the gaze of the driver that is acquired through a camera 220, thereby being able to calculate the time taken by the gaze direction of the driver to change from a gaze direction 1 to a gaze direction 2 on the basis of the point in time when the virtual object 1101 was moved to the second position from the point in time of appearance.

Further, the processor 170 can receive a DL grant from the 5G network to receive an AI processing result including whether the driver is in a drowsy state from the 5G network.

The processor 170 can receive the AI processing result for whether the driver is in a drowsy state on the basis of the DL grant. The processor 170 can already show a virtual object at the first position at the point in time of receiving the DL grant from the 5G network.

Referring to FIG. 12, the processor 170 can output feedback for the gaze response speed of the driver to virtual object instantaneously projected on the HUD. The feedback can output current state information of the driver as the result of comparison with the gaze response speed and a response speed of the driver learned in advance. The feedback can be output through a message that is displayed on the HUD and a sound signal that is output through a sound output unit.

Figure 13:
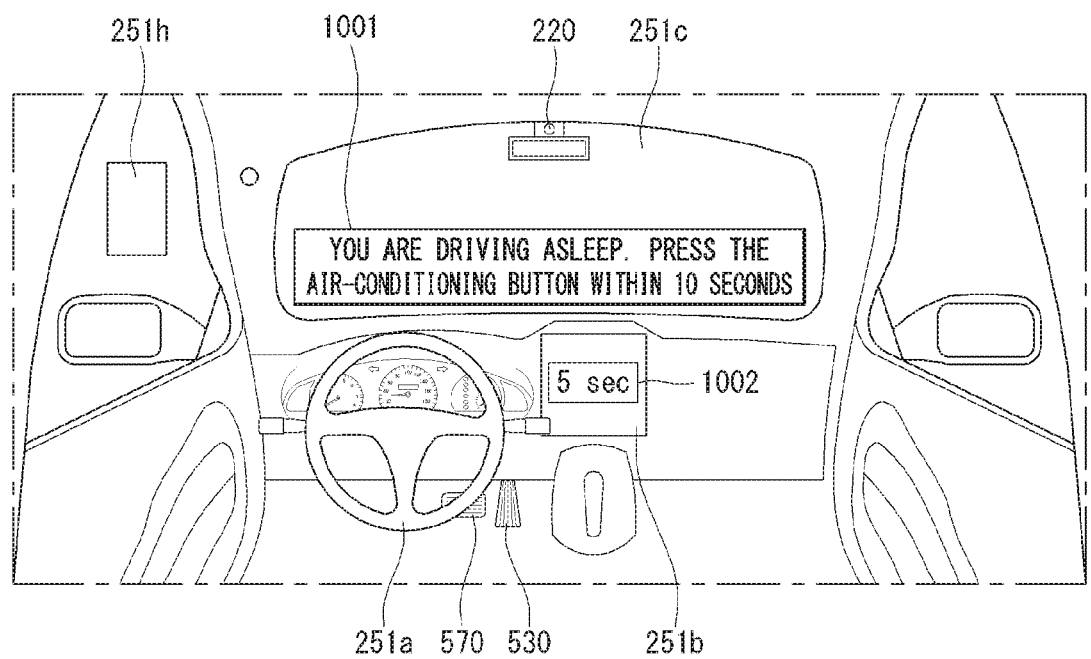
FIG. 13 is a diagram for illustrating another example in which a vehicle passively intervenes in a drowsy state of a driver in accordance with an embodiment of the present invention.

FIG. 13 is a diagram for illustrating another example in which a vehicle passively intervenes in a drowsy state of a driver in accordance with an embodiment of the present invention.

Referring to FIG. 13, when determining that the state of a driver is a drowsy state, the processor 170 can output an HUD message 1001 as a primary warning, and the HUD message may include an instruction that demand a specific action of the driver. Further, the instruction may also include time information about when the specific action of the driver will be taken. Meanwhile, the time information 1002 can be continuously updated through a display in the vehicle. The time that is continuously updated may be output through the sound output unit.

Figure 14:
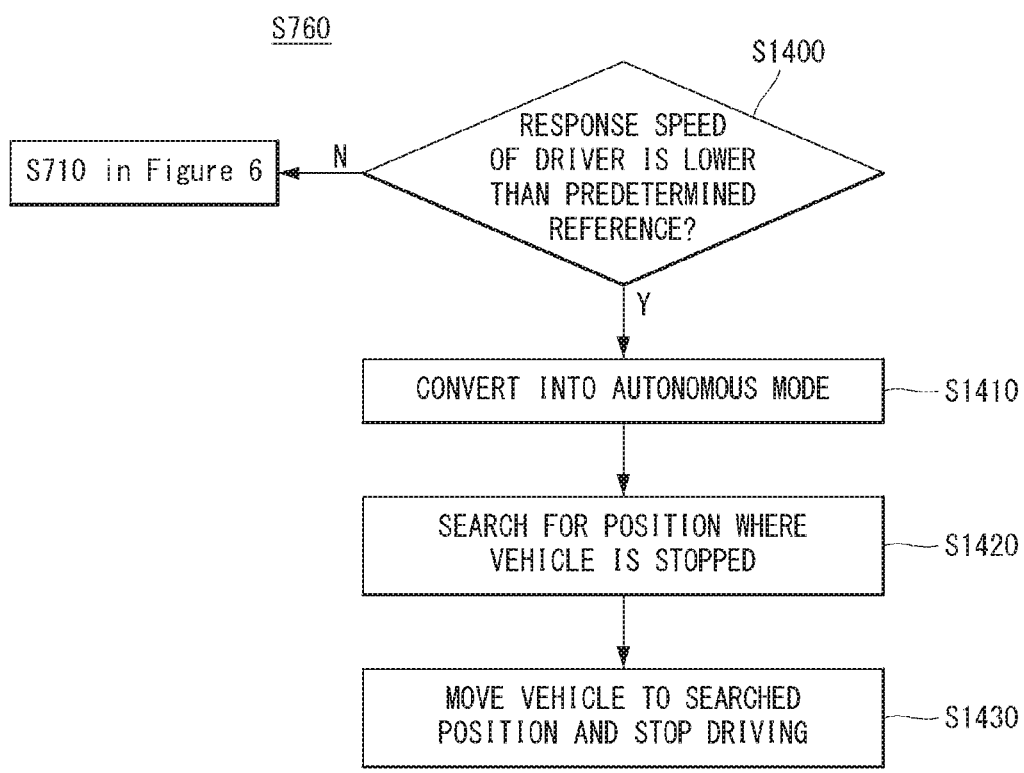
FIG. 14 is a flowchart of a vehicle control method in which a vehicle actively intervenes in a drowsy state of a driver in accordance with an embodiment of the present invention.
Figure 15:
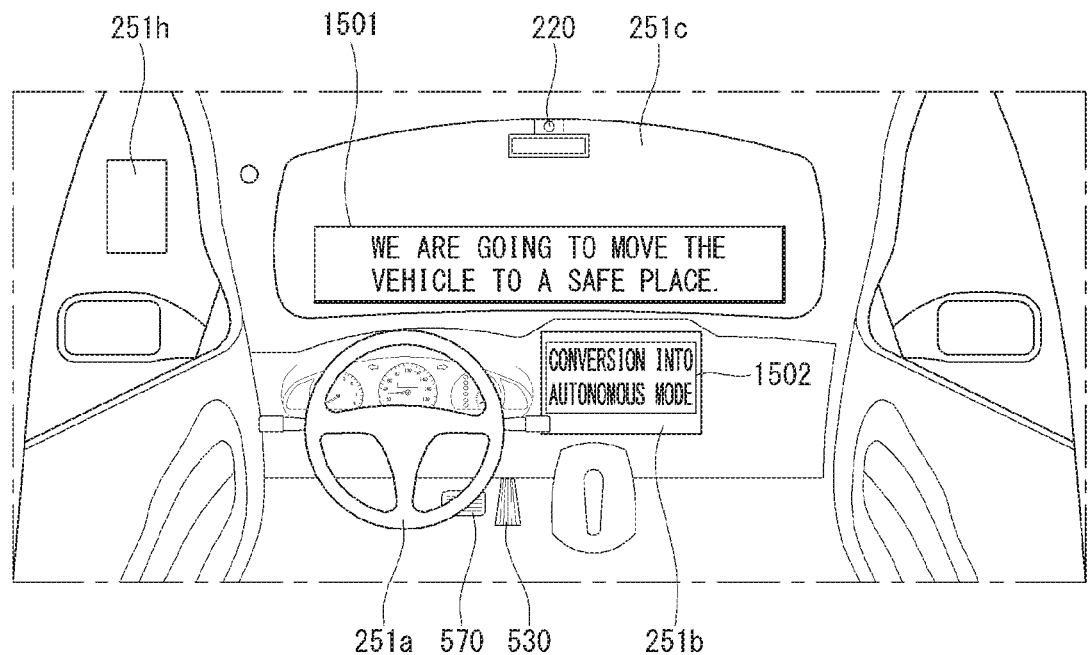
FIG. 15 is a diagram illustrating the embodiment shown in FIG. 14.

FIG. 14 is a flowchart of a vehicle control method in which a vehicle actively intervenes in a drowsy state of a driver in accordance with an embodiment of the present invention. FIG. 15 is a diagram illustrating the embodiment shown in FIG. 14.

Referring to FIG. 14, the processor 170 can determine the response speed of the driver to the primary warning that demands an action of the driver in FIG. 10 (S1400). When the response speed of the driver is lower than a predetermined reference, the processor 170 can convert the driving mode of the vehicle into an autonomous mode from a manual driving mode (S1410). The processor 170, in the autonomous mode, can search for a predetermined position where the vehicle that is being driven is stopped (S1420), control driving such that the vehicle is moved to the searched position, and stop driving at the searched position (S1430).

Referring to FIG. 15, although the driver was deprived or the driving control right due to a drowsy state, the processor 170 can output a driving plan in the autonomous mode as an HUD message 1501 or through the sound output unit. Meanwhile, when the driving mode was converted into the autonomous mode in accordance with the secondary warning, the processor 170 can display an indicator 1502 for the current driving mode on the display in the vehicle.

According to an embodiment of the present invention, when the vehicle 10 finds out a drowsy state of the driver, it is possible to transmit a message related to the drowsy state of the driver to another vehicle through V2X communication. A V2X terminal installed in the vehicle 10 can exchange various messages with a surrounding V2X base station, a V2X terminal installed in another vehicle, a V2X terminal of the driver or a pedestrian, etc. through V2X communication. Further, the mobile V2X terminal of the driver or a pedestrian can also exchange various messages with a surrounding V2X base station, the V2X terminal installed in the vehicle, etc through V2X communication. According to an embodiment of the present invention, when the vehicle 10 finds out a drowsy state of the driver, it is possible to transmit a message related to the drowsy state of the driver to another vehicle through V2X communication.

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A vehicle control method comprising:
    acquiring state information of a driver and determining a drowsy state of the driver on the basis of the state information of the driver;
    outputting a primary warning when recognizing the drowsy state of the driver, the primary warning including an operation of showing a virtual object through a head-up display (HUD) when recognizing the drowsy state of the driver;
    acquiring a gaze response speed of the driver to the virtual object by tracing the gaze of the driver through a camera in a vehicle;
    providing feedback according to the gaze response speed; and
    outputting a secondary warning and controlling the vehicle in accordance with the secondary warning when determining that the gaze response speed is lower than a predetermined reference.

2. The vehicle control method of claim 1, wherein the state information of the driver includes at least one of the number of times of closing eyelids, an open size of eyelids, or a movement speed of eyelids of the driver acquired by analyzing camera images.

3. The vehicle control method of claim 1, wherein the state information of the driver includes heart rate (HR) information that is acquired through at least one heart rate sensor and the heart rate information includes a heart rate variability (HRV) signal.

4. The vehicle control method of claim 1, wherein the determining of a drowsy state of the driver further includes:
    extracting characteristic values from sensing information that is acquired through at least one sensor; and
    inputting the characteristic values into an artificial neural network (ANN) classifier trained to discriminate whether the driver is in a wakeful state or a drowsy state, and determining a drowsy state of the driver from output of the artificial neural network, and
    the characteristic values are values enabling discrimination of the wakeful state and the drowsy state of the driver.

5. The vehicle control method of claim 1, wherein the outputting of the primary warning further includes outputting an instruction that demands an action of the driver in correspondence to the primary warning, and the secondary warning is output when the action of the driver is not recognized as a response to the instruction within a predetermined time.

6. The vehicle control method of claim 5, wherein the outputting of the instruction that demands an action of the driver includes an alarm that is displayed on the HUD and an operation that is continuously displayed until a specific action is recognized in accordance with the alarm.

7. The vehicle control method of claim 5, further comprising:
outputting a response speed of the driver when the action of the driver for the instruction is recognized within the predetermined time; and
determining a current state of the driver according to the response speed of the driver and outputting the current state of the driver.

8. The vehicle control method of claim 5, wherein recognizing the action of the driver includes at least one of recognizing input from a button disposed in the vehicle, recognizing that a window of the vehicle is opened, recognizing that an accelerator or brake pedal is depressed, or recognizing that a seatbelt is pulled.

9. The vehicle control method of claim 1, wherein the feedback includes at least one of an actual response speed in a drowsy state of the driver, a comparison result with a response speed in a wakeful state, or an alarm that recommend coming out of the drowsy state.

10. The vehicle control method of claim 1, wherein the feedback includes at least one of an operation that automatically adjusts the degree of contraction of a seatbelt, an operation of outputting vibration to a seat, and an operation of operating an automatic air-conditioning system.

11. The vehicle control method of claim 1, further comprising transmitting a V2X message including information related to the drowsy state of the driver to another terminal connected with the vehicle for communication.

12. The vehicle control method of claim 1, wherein the controlling of the vehicle in accordance with the secondary warning further includes:
converting a driving mode of the vehicle into an autonomous mode from a manual driving mode; and
searching for a position where the vehicle is stopped in the autonomous driving mode and controlling the vehicle to move to the searched position and stop driving.

13. The vehicle control method of claim 1, further comprising receiving DIC (Downlink Control Information), which is used to schedule transmission of the state information of the driver acquired from at least one sensor disposed in the vehicle, from a network,
wherein the state information of the driver is transmitted to the network on the basis of the DCI.

14. The vehicle control method of claim 13, further comprising performing an initial access procedure to the network on the basis of an SSB (Synchronization signal block),
wherein the state information of the driver is transmitted to the network through a PUSCH, and
the SSB and a DM-RS of the PUSCH are QCL with respect to a QCL type D.

15. The vehicle control method of claim 13, further comprising:
controlling a communication unit to transmit the state information of the driver to an AI processor included in the network; and
controlling the communication unit to receive AI-processed information from the AI processor,
wherein the AI-processed information is information determining the state of the driver is any one of a wakeful state or a drowsy state.

16. An intellectual computing device for controlling a vehicle, the intellectual computing device comprising:
a camera disposed in the vehicle;
a head-up display;
a sensing unit including at least one sensor;
a processor; and
a memory including a command that can be executed by the processor,
wherein the command
outputs a primary warning by showing a virtual object on a windshield of the vehicle through the head-up display when recognizing a drowsy state of a driver on the basis of state information of the driver acquired through the sensing unit, and
acquires a gaze response speed of the driver to the virtual object by tracing the gaze of the driver through the camera, provides feedback according to the gaze response speed, and outputs a secondary warning and controls the vehicle in accordance with the secondary warning when determining that the gaze response speed is lower than a predetermined reference.

17. The intellectual computing device of claim 16, wherein the processor extracts characteristic values from sensing information that is acquired through at least one sensor, inputs the characteristic values into an artificial neural network (ANN) classifier trained to discriminate whether the driver is in a wakeful state or a drowsy state, and determines a drowsy state of the driver from output of the artificial neural network, and
the characteristic values are values enabling discrimination of the wakeful state and the drowsy state of the driver.

18. The intellectual computing device of claim 16, further comprising a communication unit,
wherein the processor controls the communication unit to transmit the state information of the driver to an AI processor included in the network, and controls the communication unit to receive AI-processed information from the AI processor, and
the AI-processed information is information determining that the state of the driver is any one of a wakeful state or a drowsy state.

* * * * *